United States Patent [19]

Ide et al.

[11] Patent Number: 4,525,619
[45] Date of Patent: Jun. 25, 1985

[54] AUTOMATIC WELD LINE FOLLOWING METHOD

[75] Inventors: Eizo Ide; Hiroshi Fujimura, both of Nagasaki, Japan

[73] Assignee: Mitsubishi Jukogyo Kabushiki Kaisha, Tokyo, Japan

[21] Appl. No.: 634,120

[22] Filed: Jul. 24, 1984

Related U.S. Application Data

[63] Continuation-in-part of Ser. No. 548,423, Nov. 3, 1983, abandoned.

[30] Foreign Application Priority Data

Nov. 9, 1982 [JP] Japan .................... 57-195248

[51] Int. Cl.³ .............................. B23K 9/12
[52] U.S. Cl. ...................... 219/124.22; 219/125.12; 219/137.2
[58] Field of Search ............... 219/125.12, 124.34, 219/124.22, 130.01, 137.71, 137.2

[56] References Cited

U.S. PATENT DOCUMENTS 4,302,655 11/1981 Edling ...................... 219/125.12
4,316,075 2/1982 Isoya et al. ................ 219/125.12

FOREIGN PATENT DOCUMENTS

0008527 3/1980 European Pat. Off. .
0033127 8/1981 European Pat. Off. .
2741728 9/1977 Fed. Rep. of Germany .
3001346 1/1980 Fed. Rep. of Germany .

Primary Examiner—Clifford C. Shaw
Attorney, Agent, or Firm—Wenderoth, Lind & Ponack

[57] ABSTRACT

An automatic weld line following method for use with an arc welding method of welding a work by feeding a consumable electrode toward the weld line of the work through the tip of a welding torch and by oscillating the welding torch. The average and effective values of a welding current are detected, even if they are different, and fed to a computer so that the distance between the tip and the work is automatically controlled. At the same time, the oscillation angle is controlled to be symmetric at all times with respect to the weld line.

1 Claim, 13 Drawing Figures

AUTOMATIC WELD LINE FOLLOWING METHOD

CROSS REFERENCE TO RELATED APPLICATIONS

This application is a continuation-in-part of now abandoned application Ser. No. 548,423, filed Nov. 3, 1983.

BACKGROUND OF THE INVENTION

1. Field of the Invention

The present invention relates to a gas shielded arc welding method using a consumable electrode and, more particularly, to a weld line following method of pulsed current welding type.

2. Description of the Prior Art

In order to ensure the welding quality in the automation of welding and the assembling of a variety of structures, it is important to make the traverse of a welding torch follow the widthwise error in a welding groove accurately. In order to ensure that welding quality, the use of a detecting mechanism has been proposed according to the prior art.

However, the present detecting mechanism is deficient in heat-resistance, noise-resistance, and reliability due to the complexity in handling and the emission of an arc because a sensor is attached to the groove face or because the groove width is processed by means of an image sensor.

SUMMARY OF THE INVENTION

In view of the drawbacks of the prior art thus far described, therefore, it is an object of the present invention to provide an automatic weld line following method having a high reliability.

In order to achieve the above object, according to the present invention, in an arc welding method for welding a work by feeding a consumable electrode toward the weld line of said work through the tip of a welding torch and by oscillating said welding torch, a method for automatically following said weld line comprises the steps of: detecting average and effective values of a welding current, a consumable electrode feeding speed and a voltage between said tip and said work; arithmetically processing the detected quantities by means of a computer to determine a distance L ($L=L_E+L_A$) between said tip and a weld metal, i.e., the sum of an arc length $L_A$ and the extension length $L_E$ of said consumable electrode extending from the tip of said welding torch; detecting the deviation between the oscillation center of said welding torch and the center of a joint, which is constructed of said work, from the difference in said distance L between said tip and said weld metal in at least two predetermined oscillation positions; and controlling the position of said torch at all times so that the positional relationship between said oscillation center and said joint center may become a predetermined one, whereby an arc point can automatically follow said weld line.

BRIEF DESCRIPTION OF THE DRAWINGS

Other objects, features and advantages of the present invention will become apparent from the following description made in conjunction with the accompanying drawings, in which:

FIG. 8($a$) is a diagram illustrating the waveform of a welding current; and

FIG. 8($b$) is a graphical presentation illustrating the relationship between the average and effective values of the waveform illustrated in FIG. 8($a$).

DESCRIPTION OF THE PREFERRED EMBODIMENT

The automatic weld line following method according to the present invention will be described in detail in the following with reference to the accompanying drawings.

Figure 1:
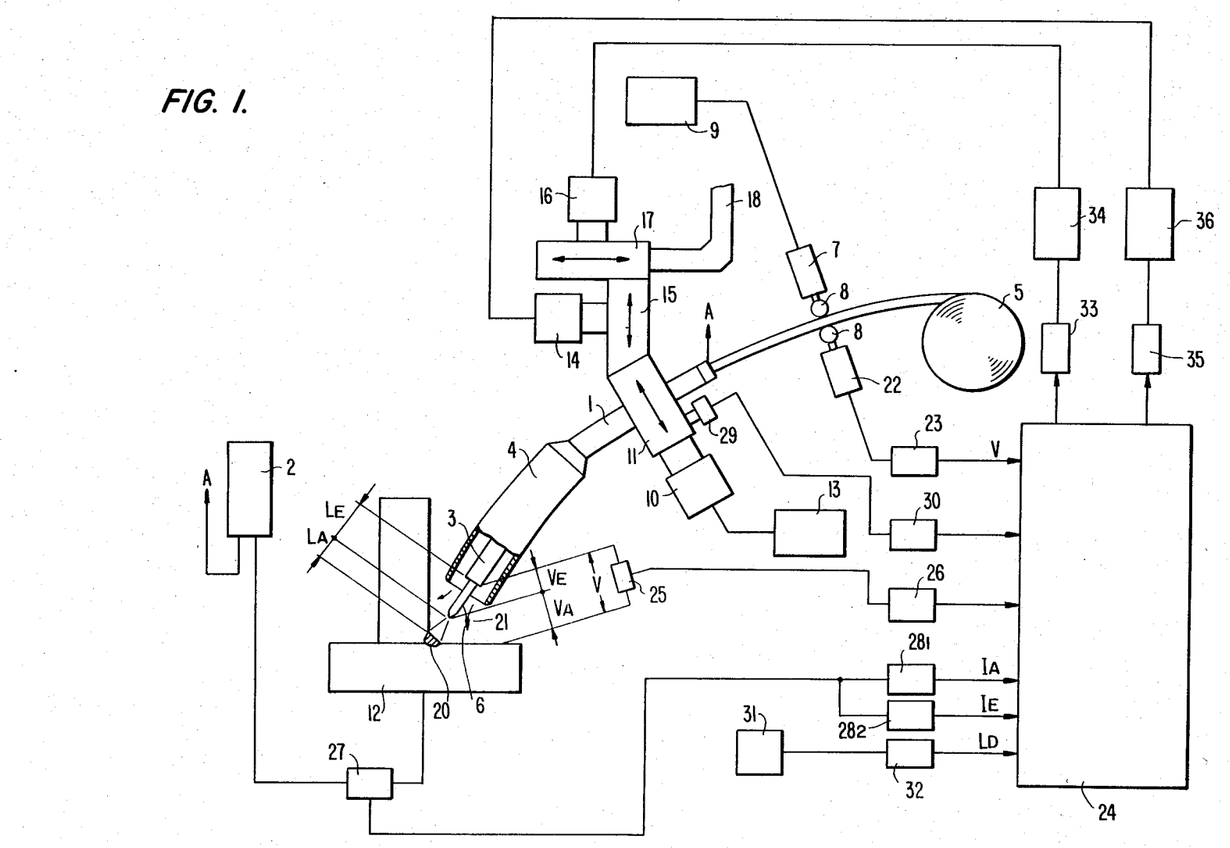
FIG. 1 is a block diagram showing the constructions of an arc welding circuit and an arithmetic processing circuit for explaining the automatic weld line following method according to the present invention.

FIG. 1 is a block diagram showing the constructions of an arc welding circuit and an arithmetic processing circuit for explaining the automatic weld line following method of the present invention. As shown in FIG. 1, a welding torch 1 is connected at a terminal A with a welding unit 2 which is equipped with a welding power source or the like, and has its leading end portion mounting a tip 3 at its center and such a shielded nozzle 4 therearound as is used to inject a shielding gas 21. A wire 6 wound on a reel 5 and acting as a consumable electrode is fed out of the base end portion of the welding torch 1 by the action of feed rollers 8, which are driven by a wire feeding motor 7, so that it runs in the axial direction through the central portion of a welding torch 1 to go out of the leading end portion of the tip 3 until its leading end is melted. The wire 6 has its feed speed regulated and controlled by the action of a drive control power source 9 of the wire feeding motor 7. On the other hand, the welding torch 1 has its base end portion mounted on an oscillator 11, which is equipped with a drive motor 10, so that it is oscillated with respect to the weld line of a work 12. Reference numeral 13 indicates a control power source for driving the drive motor 10. The oscillator 11 is mounted on a vertical traverse mechanism 15 which is equipped with a drive motor 14 and which in turn is mounted on a horizontal traverse mechanism 17 equipped with a drive motor 16. As a result, the position of the leading end of the tip 3 relative to the work 12 can be changed by the actions of those mechanisms.

Incidentally, the aforementioned horizontal traverse mechanism 17 is supported on an arm 18 which in turn is carried on a truck (although not shown) and by which those welding accessories including the welding torch 1, the oscillator 11, the vertical traverse mechanism 15, the horizontal traverse mechanism 17 and so on are moved along the weld line. In the drawing, reference numerals 19 and 20 indicate an arc to be generated at the leading end portion of the wire and a weld metal, respectively.

In order that the welding operation of the welding apparatus thus described can be controlled even in case a welding current I is of pulsed shape as in a clean magnetic welding operation such as a pulsed current welding operation, predetermined functional relationships have to be satisfied, according to the experiments, among the average and effective values of the welding current, a wire feeding speed v, an arc voltage $V_A$, a wire extension length $L_E$, an arc length $L_A$ and so on.

Therefore, the aforementioned welding apparatus is equipped with detectors for detecting the wire feeding speed v, the average and effective values of the welding current and a voltage V between the tip and the work as such variables as are necessary for the welding control. A detector 22 for detecting the wire feeding speed v is attached to the feed rollers 8 so that it analog output is converted by the action of an analog-digital converter (which will be shortly referred to as an "A/D converter") 23 into a digital output, which is fed to a digital computer 24. Moreover, the voltage V between the tip 3 and the work 12 is detected by a voltage detector 25 whose output signal is fed through an A/D converter 26 to the arithmetic computer 24. In order to detect the welding current I, still moreover, a current detector 27 is connected between the welding unit 2 and the work 12 so that the average value $I_A$ and the effective value $I_E$ of the welding current are determined from the output signal of the current detector 27 by the actions of an average current detecting A/D converter $28_1$ and an effective current detecting A/D converter $28_2$ and are subjected to A/D conversion and then fed to the computer 24. Incidentally, the apparatus under consideration requires the position of the welding torch 1 as one of the control elements because the torch 1 is oscillated within the welding groove. For this requirement, the oscillator 11 is equipped with an oscillated position detector 29 which is made operative to detect the instant position of the welding torch 1 and the output of which is fed through an A/D converter 30 to the computer 24. Furthermore, the computer 24 is equipped in advance through an A/D converter 32 with a distance setter 31 for setting the distance between the tip 3 and the work 12, i.e., the tip-weld metal distance $L_D$.

The computer 24 computes the values of the signals needed for controlling the position of the welding torch 1 on the basis of a group of the aforementioned input signals and the output of which, i.e., a horizontal traverse control signal which is fed through a digital-analog converter (which will be subsequently referred to as a "D/A converter") 33 to a motor control power source 34 which is used as a power source for the drive motor 16 of the horizontal traverse mechanism 17. On the other hand, the vertical traverse control signal is fed through a D/A converter 35 to a motor control power source 36 which is used as a power source for the drive motor 14 of the vertical traverse mechanism 15.

The analog signals, which have been detected by their respective detectors, are converted into digital quantities by the A/D converters and are fed to the computer 24. Here, if the following notations are used:

I: the welding current;
$I_A$: the average value of the welding current;
$I_E$: the effective value of the welding current;
v: the wire feeding speed;
V: the voltage between the tip 3 and the work 12;
$L_E$: the wire extension length of the wire from the leading end of the tip to the arc 19;
$L_A$: the arc length from the leading end of the wire 6 to the weld metal 20;
L: the distance from the leading end of the tip 3 to the weld metal 20;
$V_E$: the voltage drop at the wire extension; and
$V_A$: the arc voltage, then the aforementioned several quantities approximately satisfy the following functional relationships:

$$L_E = f_1(I_A, I_E, v) \tag{1}$$

$$V_E = f_2(I_A, v, L_E) \tag{2}$$

$$V_A = V - V_E \tag{3}$$

$$L_A = f_3(I_A, V_A) \tag{4}$$

$$L = L_A + L_E \tag{5}$$

In the above: the Equation (1) is discussed in detail in "Investigations on Current Controlled Arc Wedling, Welding Law Commitee of Welding Association, July, 1980"; the Equation (4) is discussed in "Supplement of Welding Arc Phenomena, Sanpoh, by Kohhei Ando et al, pp 105"; and the specific form of the Equation (2) is determined from experiments. The Equations (3) and (5) are apparent from the drawings.

If, therefore, the computer 24 is programmed with Equations (1)–(5), the wire extension length $L_E$ from the leading end of the tip 3 is obtained from the average and effective values $I_A$ and $I_E$ of the welding current and the wire feeding speed v by the Equation (1).

The voltage $V_E$ of the wire extension is obtained from the average value $I_A$ of the welding current, the wire extension length $L_E$ and the wire feeding speed v by the Equation (2).

The arc voltage $V_A$ is obtained from the voltage V between the tip 3 and the work 12 and from the voltage $V_E$ of the wire extension by the Equation (3).

The arc length $L_A$ is obtained from the average value of the welding current and the arc voltage $V_A$ by the Equation (4).

The tip-weld metal distance L is obtained as the sum of the wire extension length $L_E$ and the arc length $L_A$, which have been obtained by the foregoing computations, by the Equation (5).

Next, the digital value $L_D$ is fed to the computer 24 by the actions of the tip-weld metal distance setter 31 and the A/D converter 32. The digital sum $(L_E + L_A)$ of the wire extension length $L_E$ and the arc length $L_A$, which has been obtained in advance, is compared with the tip-weld metal distance setter $L_D$ by means of the computer 24. The result of this comparison is fed through the D/A converter 35 to the motor control power source 36 so that the torch 1 is vertically traversed by the action of the vertical traverse mechanism 15. For example, the torch 1 is traversed downward for $(L_E + L_A) > L_D$ and upward for $(L_E + L_A) < L_D$. In the manner thus far described, the tip-weld metal distance L can be controlled to an arbitrary value by means of the tip-weld metal distance setter 31.

Figure 2:
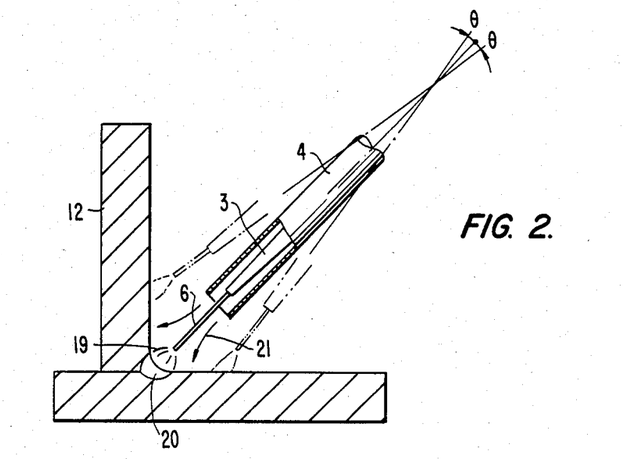
FIG. 2 is a schematic view illustrating the state in which a torch is oscillated on its axis directed toward a weld line.
Figure 5:
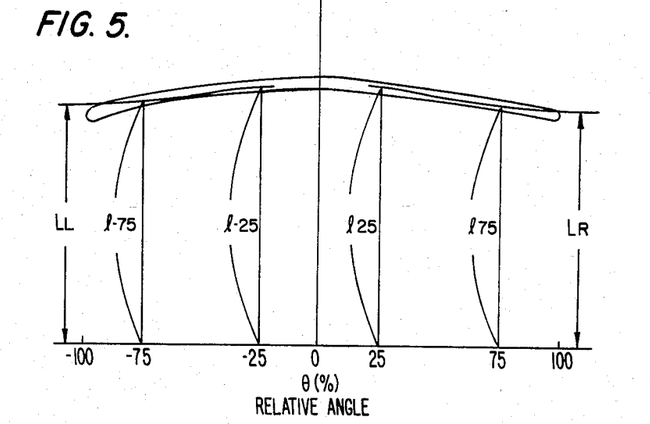
FIG. 5 is a diagram illustrating the varying pattern of the distance between a tip and a weld metal in the case of the oscillation shown in FIG. 2.

On the other hand, the welding torch 1 is oscillated by the action of the oscillator 11. In case the intersection of the joint of the work 12, i.e., the weld line is located on the extension of the wire 6 when the welding torch 1 is not oscillated, this welding torch 1 is oscillated on an axis joining the center of oscillation and the center of the weld line, as shown in FIG. 2. If the oscillations of the welding torch 1 are simple harmonic motions or similar motions in parallel with the drawing face, the tip-weld metal distance L is plotted, as illustrated in FIG. 5, against a relative angle $\theta$ of oscillation (which is an arbitrary amplitude expressed in percentage for the maximum amplitude). FIG. 5 corresponds to the case in which the torch axis is at 45 degrees with respect to a horizontal plane when the oscillation angle $\theta$ of the welding torch 1 is 0 degrees.

Figure 9:
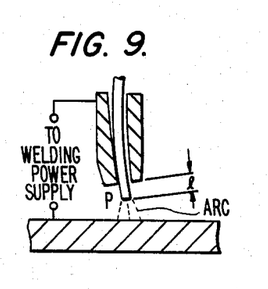
FIGS. 9 and 10 are diagrams used to explain the operation of the present invention.

In FIG. 9, a current feed point is designated by character P. The temperature distribution Q (x,t) along the length x of the wire, which is dependent upon time t, can be derived from the following differential equation:

$$c\rho \frac{\partial \theta}{\partial t} = H \frac{\partial^2 \sigma}{\partial x^2} + \frac{1}{J} \cdot \eta \delta^2 - \frac{4}{d} \cdot \lambda \sigma$$

where
  c: specific heat,
  $\rho$: specific gravity,
  $\gamma$: thermal conductivity,
  J: mechanical equivalent of heat,
  $\eta$: specific resistance,
  $\delta$: current density, and
  $\lambda$: thermal radiation rate.

In the above differential equation, if the thermal radiation from the surface and the heat conduction through the wire are disregarded, then the temperature rise caused by the Joule's heat can be represented by the following equation:

$$c\rho v \frac{d\theta}{dx} = \eta \delta^2 / J \quad (1')$$

$$\left[ \because \frac{dx}{dt} = v \right]$$

Here, the following temperature dependency of the specific resistance $\eta$ and the specific heat c is assumed:

$$\begin{matrix} \eta = \eta_0(1 + \beta \theta) \\ c = c_0(1 + \gamma \theta) \end{matrix} \Big\} \quad \text{$\beta$ and $\gamma$ are temperature coefficients of the respective parameters.}$$

Equation (1') above is originally represented by the following equation:

$$Jc\rho \cdot \frac{d\sigma}{dt} = \eta \delta^2 \quad (2')$$

Therefore, if the temperature dependency of the $\eta$ and c above is substituted in Equation (2'), then the following relationships can be obtained:

$$\left. J\rho c_0 d\theta = \delta^2 \eta_o \frac{1 + \beta\theta}{1 + \gamma\theta} dt \approx \delta^2 \eta_o (1 + d\theta)dt \right\} \quad (3')$$
$$\alpha = \beta - \gamma$$

Resolving this differential equation, we obtain, $$\sigma = \frac{1}{\alpha}(e^{at} - 1) \quad (4')$$

where $a = \alpha \delta^2 \eta_o / j\rho C_o$.
Here, attention should be paid to the relationship of $t = x/v$, $$\delta = \frac{4}{\pi d^2} \cdot I_E$$

where
  v: wire feeding speed,
  d: wire diameter,
  $I_E$: effective value of welding current.

Therefore, Equation (4') above can be represented in the following form:

$$\theta = \frac{1}{\alpha} \left( e^{k_1 \cdot \frac{I_E^2}{v} \cdot x} - 1 \right) , \quad (5')$$

where $k_1 = 16 \alpha \eta_o / \pi^2 J \rho C_o d^4$.

Figure 10:
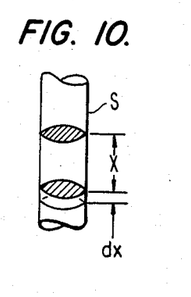

Here, it is to be noted that a resistance r of a wire having a cross-section area S and a length x as shown in FIG. 10 is represented by $r = \eta(x/S)$, and $\eta = \eta_o(1 + \beta\sigma)$ is fulfilled as described previously, where $\sigma$ represents a temperature and $\eta$ represents a specific resistance of the material forming the wire. Therefore, a resistance dr of a minute length dx of the wire is represented as follows:

$$dr = \eta_o(1 + \beta\sigma)\frac{dx}{S} \quad (6')$$

From Equations (5') and (6') above, the following relationship is derived:

$$dr = \frac{4\eta_o}{\pi d^2} \left\{ \left(1 - \frac{\beta}{\alpha}\right) + \frac{\beta}{\alpha} \cdot e^{\frac{k_1 I_E^2}{v} x} \right\} dx$$

Since the resistance R of the projected portion of the wire is an integral of the above dr from x=o to x=$L_E$, the resistance R can be represented by the following equation:

$$R = \frac{4\eta_o}{\pi d^2} \left\{ \left(1 - \frac{\beta}{\alpha}\right) L_E + \frac{\beta}{\alpha} \cdot \frac{v}{k_1 I_E^2} \left( e^{\frac{k_1 I_E^2}{v} L_E} - 1 \right) \right\} \quad (7')$$

Therefore, the voltage drop $V_E$ across the projecting portion of the wire can be calculated by the following equation:

$$V_E = R \cdot I_A \quad (8')$$

$$= \frac{4\eta_o}{\pi d^2} \left\{ \left(1 - \frac{\beta}{\alpha}\right) L_E \cdot I_A + \frac{\beta}{\alpha} \cdot \frac{\nu I_A}{k_1 I_E{}^2} \left( e^{\frac{k_1 I_E{}^2}{\nu} L_E} - 1 \right) \right\}$$

where $I_A$ represents an average value of a welding current. Equation (8') above is the detailed form of the aforementioned equation (2).

Figure 11:
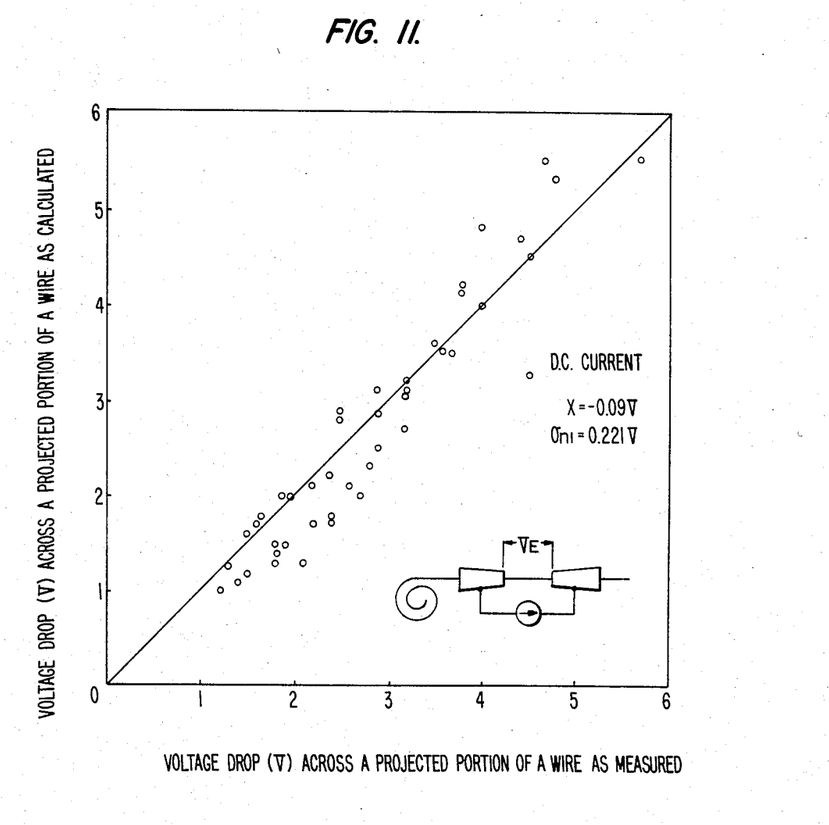
FIG. 11 is a comparison between the measured and calculated values.

A diagram showing the relationship between the calculated values and measured values of the voltage drop $V_E$ across the projected portion of the wire is shown in FIG. 11.

Figure 12:
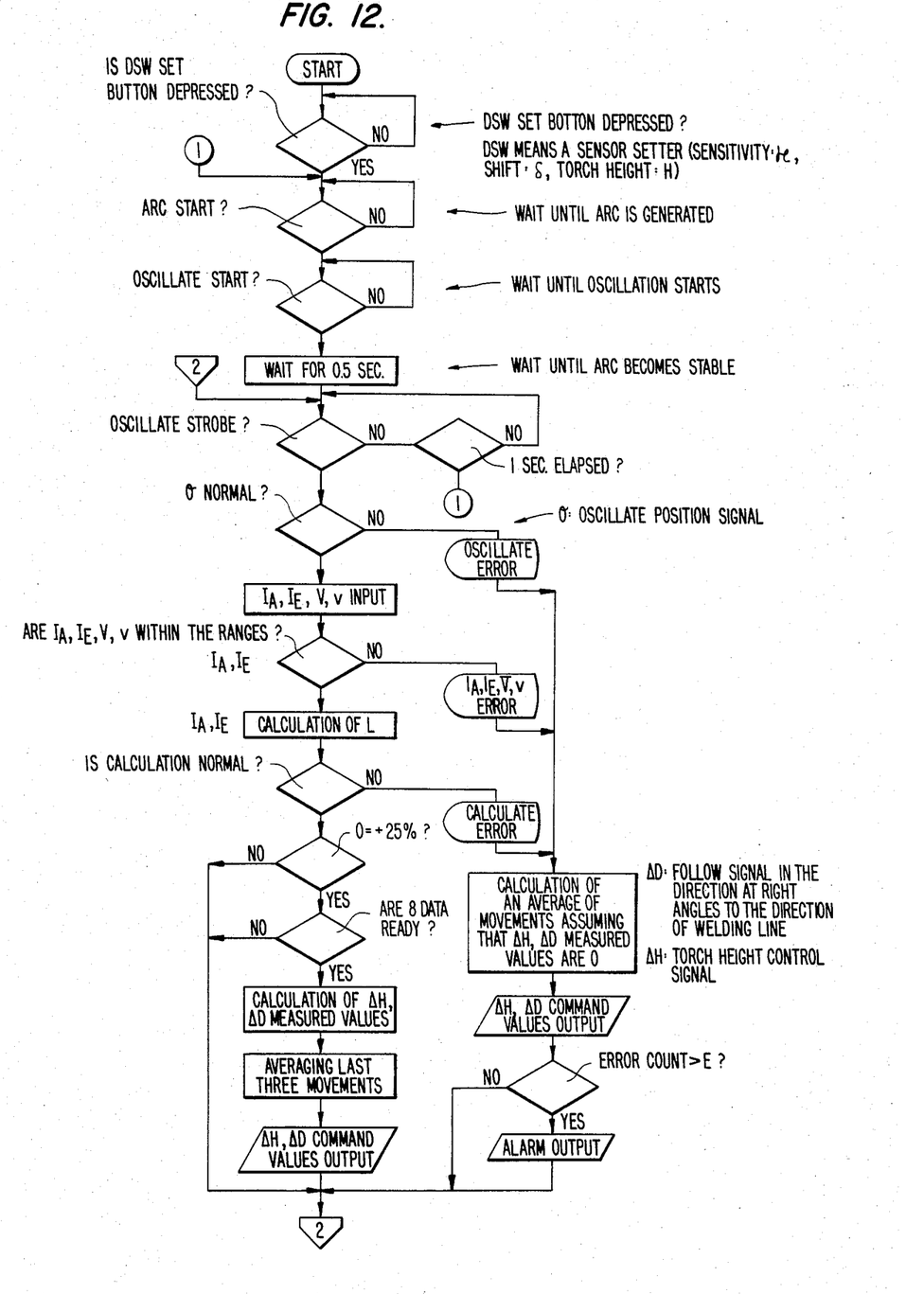
FIG. 12 is a flowchart of a computer program used for the MARSE sensor calculation.

FIG. 12 illustrates a general flowchart for the sensor calculation. In view of the straight forward nature of the flowchart and the previously noted detail of the equations, a detailed discussion of each of the steps has been ommitted for brevity.

Figure 6:
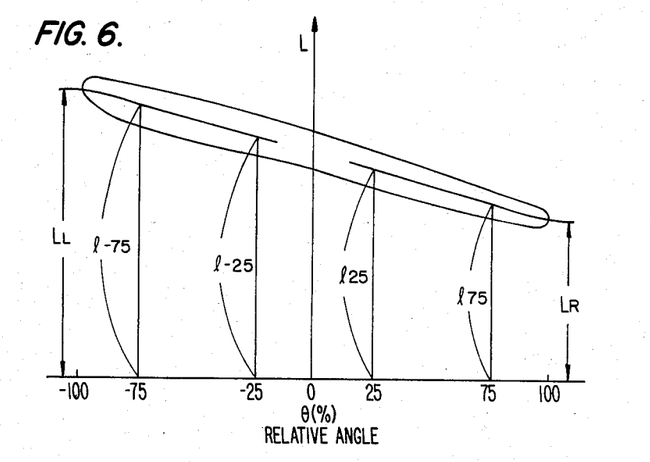
FIG. 6 is a diagram illustrating the varying pattern of the distance between the tip and the weld metal in the case of the oscillation shown in FIG. 3.
Figure 7:
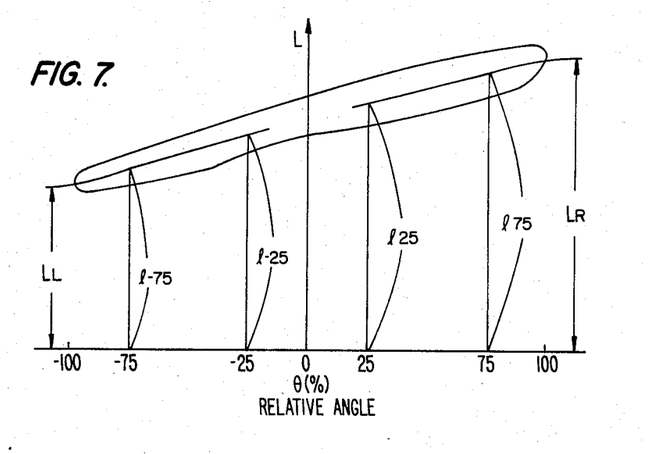
FIG. 7 is a diagram illustrating the varying pattern of the distance between the tip and the weld metal in the case of the oscillation shown in FIG. 4.

FIGS. 5 to 7 illustrate the patterns which are used to determine deviation between the central position of the joint and the oscillation center position of the welding torch 1 from the patterns drawn by the tip-weld metal distance L and the angle $\theta$. Here, the average points of the tip-weld metal distance L in the cases of the oscillation positions for $\theta=25\%$ and $\theta=75\%$ are joined by a straight line to obtain an extrapolated value $L_R$ for $\theta=100\%$, and the average points of the tip-weld metal distance L in the cases of the oscillation positions for $\theta=-25\%$ and $\theta=-75\%$ are likewise joined by a straight line to obtain an extrapolated value $L_L$ for $\theta=-100\%$. Then, the resultant extrapolated values $L_R$ and $L_L$ are compared. In this case, the oscillation positions are determined for $\theta=\pm25\%$, $\pm75\%$ and $\pm100\%$ but should not be limited to those values.

In FIG. 5, the average values of the tip-weld metal distance L for $\theta=-75\%$, $\theta=-25\%$, $\theta=25\%$ and $\theta=75\%$ are denoted as $l_{-75}$, $l_{-25}$, $l_{25}$ and $l_{75}$. If, in this instance, the samplings of the angle $\theta$ and the distance L are assumed to be one period of oscillation, average values are taken for l because this l has two values for $\theta=\pm25\%$ and $\theta=\pm75\%$. Moreover, FIG. 5 provides a $\theta-L$ coordinate plane, in which points $(-75, l_{-75})$ and $(-25, l_{-25})$ are joined by a straight line and in which the distance L for $\theta=-100\%$ is denoted at $L_L$. Likewise, points $(25, l_{25})$ and $(75, l_{75})$ are jointed by a straight line, and the distance for $\theta=100\%$ is denoted at $L_R$.

The experimental results reveal that, for $L_L-L_R=0$, if the welding torch 1 is not oscillated, i.e., if the amplitude of oscillation is zero, the leading end of the wire 6 is directed toward the weld line of the work. In order that the weld line may be located on the extension of the wire 6 when the oscillation amplitude of the welding torch 1 is zero, more specifically, it is sufficient that the horizontal position of the welding torch be controlled to satisfy $L_L-L_R=0$ in the locus of the distance L against the angle $\theta$.

Figure 3:
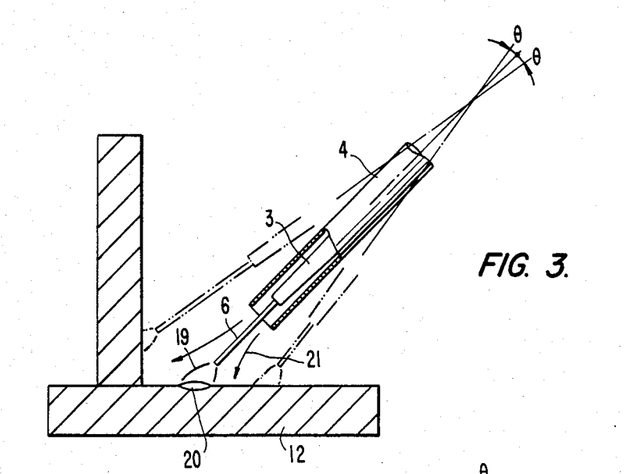
FIGS. 3 and 4 are also schematic views illustrating two examples of the states in which the welding torch is oscillated on its axis so as to not be directed toward the weld line.

In FIGS. 3 and 6, moreover, FIG. 3 corresponds to the case in which there is no weld line on the extension of the wire 6 when the welding torch 1 is not oscillated, i.e., in which the welding torch 1 is close to the lower plate of the work to be welded. If, in this case, the oscillations of the welding torch 1 are simple harmonic motions or similar motions in parallel with the drawing face, the tip-weld metal distance L takes such a shape against the oscillation angle $\theta$ as is illustrated in FIG. 6.

In FIG. 6, the average values of the distance L for $\theta=-75\%$, $\theta=-25\%$, $\theta=25\%$ and $\theta=75\%$ during one period of the angle $\theta$ are denoted at $l_{-75}$, $l_{-25}$, $l_{25}$ and $l_{75}$. Then, in FIG. 6 as in FIG. 5, points $(-75, l_{-75})$ and $(-25, l_{-25})$ are joined by a straight line in the $\theta-L$ plane to denote at $L_L$ the distance L for $\theta=-100\%$, and points $(25, l_{25})$ and $(75, l_{75})$ are joined by a straight line to denote at $L_R$ the distance for $\theta=100\%$.

The experimental results reveal that the relationship between $\theta$ and L takes a shape illustrated in FIG. 6, as the welding torch 1 approaches the lower plate of the work 12, as shown in FIG. 3, to result in $L_L>L_R$. For $L_L>L_R$, the horizontal traverse mechanism 17 is driven by the motor 16 to realize $L_L-L_R=0$ so that the welding torch 1 may come closer to the upper plate. Then, the welding torch 1 can be so positioned that the center line of oscillation may be directed to the weld line.

Figure 4:
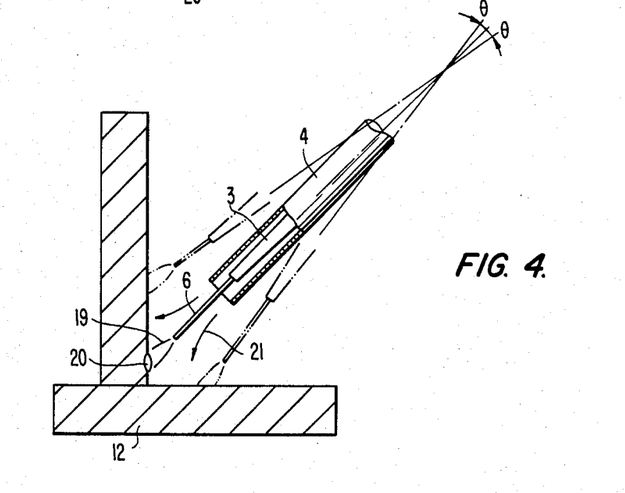

FIG. 4 corresponds to the case in which the welding torch 1 comes closer to the upper plate on the contrary to the case of FIG. 3. FIG. 7 illustrates the pattern which is drawn by the angle $\theta$ and the distance L in the case of FIG. 4. As the welding torch 1 comes closer to the upper plate of the work 12, the relationship between $L_L$ and $L_R$ is expressed by $L_R>L_L$, as illustrated in FIG. 7. In this case of $L_R>L_L$, therefore, the horizontal traverse mechanism 17 is driven by the motor 16 to realize $L_R-L_L=0$ so that the welding torch 1 may come closer to the lower plate. Then, the welding torch 1 can be so positioned that the center line of oscillation may be directed to the weld line.

Since the operating procedures thus far described are programmed in advance in the digital computer 24, the arc point is forced at all times to follow the weld line. Thus, the tip-weld metal distance L can be held at the predetermined value $L_D$, and even in case the arc point fails to follow the weld line this deviation can be automatically detected to remedy the orbit.

Figure 8A:
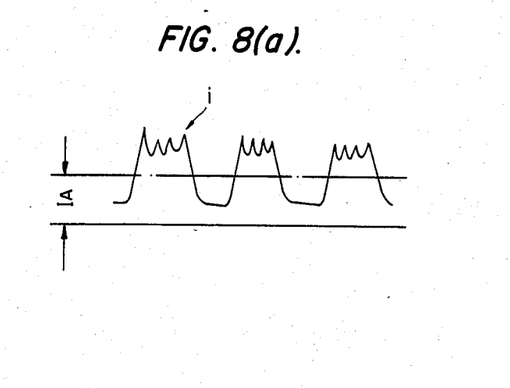
Figure 8B:
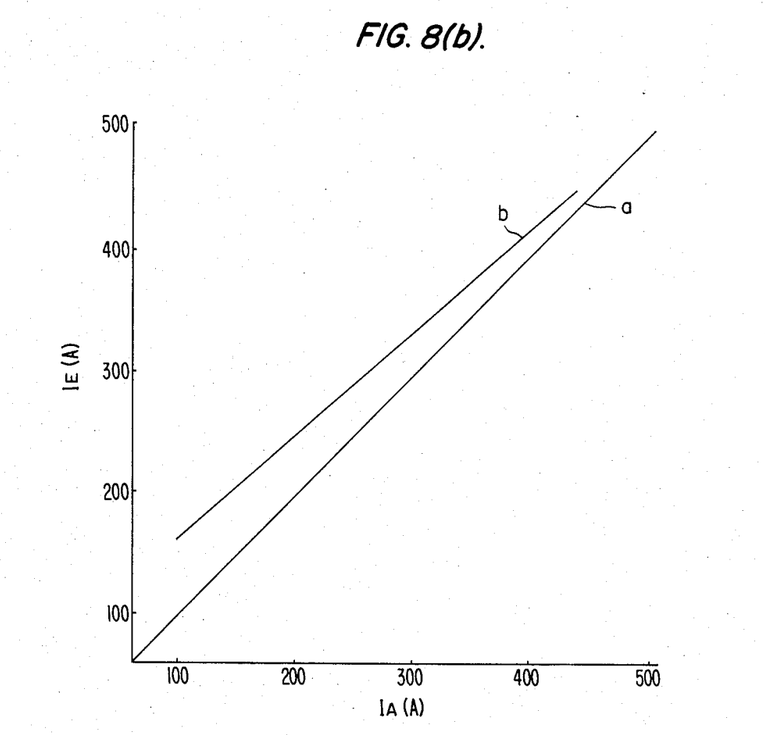

FIG. 8(a) illustrates the waveform of the welding current in case the clean magnetic welding machine is used, and FIG. 8(b) illustrates the relationship between the average and effective values of the welding current having such waveform. In FIG. 8(b), incidentally, a straight line a corresponds to the case of $I_E=I_A$, and a straight line b corresponds to the case of actual measurements.

Since the welding current has the pulsed waveform, as indicated in FIG. 8(a), the automatic weld line following method according to the present invention imparts none of the undesirable results to the welding results even in case the average and effective values of the welding current are different.

According to the automatic weld line following method of the present invention, therefore, even in case the welding current has different average and effective values as in the pulsed current, its different average and effective values are detected and fed to the computer so that the distance between the tip and the work is automatically controlled and so that the oscillation angle is controlled to be symmetric at all times with respect to the weld line. As a result, even if the alignment of the weld line is roughly made at first, the oscillation center of the welding torch is corrected so that a highly accurate welding operation is performed. Therefore, an unattended welding operation of high accuracy can be conducted by applying the method of the present invention to a welding robot or the like.

Although the foregoing description of the embodiment of the present invention has been directed to the example in which the signal processing is made through the A/D and D/A converters by means of the digital computer, the arithmetic processing itself can be effected by means of an analog computer.

What is claimed is:

1. In an arc welding method for welding a work by feeding a consumable electrode toward the weld line of said work through the tip of a welding torch and by oscillating said welding torch, a method for automatically following said weld line comprising the steps of:

detecting average and effective values of a welding current, a consumable electrode feeding speed and a voltage between said tip and said work;

arithmetically processing the detected quantities by means of a computer to determine a distance L ($L=L_E+L_A$) between said tip and a weld metal which is equal to the sum of an arc length $L_A$ and the extension $L_E$ of said consumable electrode extending from the tip of said welding torch;

detecting the deviation between the oscillation center of said welding torch and the center of a joint, which is constructed of said work, from the difference in said distance L between said tip and said weld metal in at least two predetermined oscillation positions; and controlling the position of said torch at all times so that the positional relationship between said oscillation center and said joint center corresponds to a predetermined relationship, whereby an arc point can automatically follow said weld line.

* * * * *